US012591587B2

(12) United States Patent
Parvangada et al.

(10) Patent No.: US 12,591,587 B2
(45) Date of Patent: Mar. 31, 2026

(54) AUTOMATICALLY CONVERTING NETWORK MONITORING AND ANALYSIS ALARM PROCESSING RULES INTO NETWORK SERVICE ASSURANCE SYSTEM POLICY ENGINE FRAMEWORK POLICIES

(71) Applicant: AT&T Intellectual Property I, L.P., Atlanta, GA (US)

(72) Inventors: Sudharani Parvangada, Manalapan, NJ (US); Zosim Kanevsky, Wayne, NJ (US); Prafulla Verma, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/896,630

(22) Filed: Sep. 25, 2024

(65) Prior Publication Data
US 2026/0087029 A1     Mar. 26, 2026

(51) Int. Cl.
| | |
|---|---|
| *G06F 16/00* | (2019.01) |
| *G06F 16/25* | (2019.01) |
| *G06F 16/28* | (2019.01) |
| *H04L 41/06* | (2022.01) |

(52) U.S. Cl.
CPC .......... *G06F 16/258* (2019.01); *G06F 16/285* (2019.01); *H04L 41/06* (2013.01)

(58) Field of Classification Search
None
See application file for complete search history.

(56) References Cited

U.S. PATENT DOCUMENTS

| | | | | |
|---|---|---|---|---|
| 11,256,659 | B1 * | 2/2022 | Gu | G06F 16/144 |
| 2017/0060661 | A1 * | 3/2017 | Tee | G06F 11/079 |
| 2018/0102938 | A1 * | 4/2018 | Yoon | G06F 16/358 |
| 2020/0134523 | A1 * | 4/2020 | Nelson | G06N 20/00 |
| 2020/0162315 | A1 * | 5/2020 | Siddiqi | H04L 41/22 |
| 2021/0092026 | A1 * | 3/2021 | Di Pietro | G06N 3/0985 |
| 2021/0158106 | A1 * | 5/2021 | Vasseur | H04L 41/16 |
| 2021/0184958 | A1 * | 6/2021 | Kolar | H04L 43/14 |
| 2022/0101375 | A1 * | 3/2022 | Moreno | G06Q 30/0254 |
| 2022/0253764 | A1 * | 8/2022 | Nelson | G06Q 10/0635 |
| 2022/0346160 | A1 * | 10/2022 | Agrawal | G06F 9/45558 |
| 2022/0353166 | A1 * | 11/2022 | Kolar | H04L 43/14 |
| 2024/0223439 | A1 * | 7/2024 | Lo | H04L 45/22 |
| 2024/0356797 | A1 * | 10/2024 | Lo | H04L 43/0811 |

* cited by examiner

*Primary Examiner* — Farhan M Syed

(57)     ABSTRACT

A method includes acquiring network monitoring and analysis (NMA) alarm processing rules residing in flat format data files, transforming the flat format data files into comma-separated values (CSV) files, clustering the CSV files into a plurality of clusters each containing a subset of the CSV files, for a selected cluster, aggregating the subset contained within the selected cluster, so that the subset is transformed into a smaller subset, applying at least one pre-processing technique to the smaller subset, converting the smaller subset of CSV files into JavaScript object notation (JSON) files, executing a generative artificial intelligence technique that takes as an input one of the JSON files and an example network service assurance system (NSAS) policy engine framework (PEF) policy and outputs a code for converting any JSON file into a NSAS PEF policy, and transforming, using the code, the JSON files into NSAS PEF policies.

20 Claims, 5 Drawing Sheets

AUTOMATICALLY CONVERTING NETWORK MONITORING AND ANALYSIS ALARM PROCESSING RULES INTO NETWORK SERVICE ASSURANCE SYSTEM POLICY ENGINE FRAMEWORK POLICIES

The present disclosure relates generally to wireless networks, and relates more particularly to devices, non-transitory computer-readable media, and methods for automatically converting network monitoring and analysis (NMA) alarm processing rules into network service assurance system (NSAS) policy engine framework (PEF) policies.

BACKGROUND

In wireless networking, a network monitoring and analysis (NMA) system is responsible for monitoring a wireless network to ensure optimal availability and performance of the network. The NMA system may use alarm processing rules to generate a singular, actionable root cause trouble ticket for alarms that are generated within the network (where the alarms may indicate the presence of conditions, such as hardware failures, key performance indicator degradations, or the like, that may lead to sub-optimal network performance). The alarm processing rules are crucial for supervising the Layer 1 transport network.

SUMMARY

In one example, the present disclosure describes a device, computer-readable medium, and method for converting network monitoring and analysis alarm processing rules into network service assurance system policy engine framework policies. For instance, in one example, a method performed by a processing system including at least one processor includes acquiring a plurality of network monitoring and analysis alarm processing rules residing in a plurality of flat format data files, transforming the plurality of flat format data files into a plurality of comma-separated values format data files, clustering the plurality of comma-separated values data files into a plurality of clusters, wherein each cluster of the plurality of clusters contains a subset of the plurality of comma-separated values data files, for a selected cluster of the plurality of clusters, aggregating the subset contained within the selected cluster, so that the subset is transformed into a smaller subset, applying at least one pre-processing technique to the smaller subset, wherein the at least one pre-processing technique includes a technique that converts the smaller subset of comma-separated values data files into a plurality of JavaScript object notation format files, executing a generative artificial intelligence technique that takes as an input a JavaScript object notation format file of the plurality of JavaScript object notation format files and an example network service assurance system policy engine framework policy and generates as an output a code for converting any JavaScript object notation format file into a network service assurance system policy engine framework policy, and transforming, using the code, the plurality of JavaScript object notation format files into a plurality of network service assurance system policy engine framework policies.

In another example, a non-transitory computer-readable medium stores instructions which, when executed by the processing system, cause the processing system to perform operations. The operations include acquiring a plurality of network monitoring and analysis alarm processing rules residing in a plurality of flat format data files, transforming the plurality of flat format data files into a plurality of comma-separated values format data files, clustering the plurality of comma-separated values data files into a plurality of clusters, wherein each cluster of the plurality of clusters contains a subset of the plurality of comma-separated values data files, for a selected cluster of the plurality of clusters, aggregating the subset contained within the selected cluster, so that the subset is transformed into a smaller subset, applying at least one pre-processing technique to the smaller subset, wherein the at least one pre-processing technique includes a technique that converts the smaller subset of comma-separated values data files into a plurality of JavaScript object notation format files, executing a generative artificial intelligence technique that takes as an input a JavaScript object notation format file of the plurality of JavaScript object notation format files and an example network service assurance system policy engine framework policy and generates as an output a code for converting any JavaScript object notation format file into a network service assurance system policy engine framework policy, and transforming, using the code, the plurality of JavaScript object notation format files into a plurality of network service assurance system policy engine framework policies.

In another example, a system includes a processing system including at least one processor and a non-transitory computer-readable medium storing instructions which, when executed by the processing system, cause the processing system to perform operations. The operations include acquiring a plurality of network monitoring and analysis alarm processing rules residing in a plurality of flat format data files, transforming the plurality of flat format data files into a plurality of comma-separated values format data files, clustering the plurality of comma-separated values data files into a plurality of clusters, wherein each cluster of the plurality of clusters contains a subset of the plurality of comma-separated values data files, for a selected cluster of the plurality of clusters, aggregating the subset contained within the selected cluster, so that the subset is transformed into a smaller subset, applying at least one pre-processing technique to the smaller subset, wherein the at least one pre-processing technique includes a technique that converts the smaller subset of comma-separated values data files into a plurality of JavaScript object notation format files, executing a generative artificial intelligence technique that takes as an input a JavaScript object notation format file of the plurality of JavaScript object notation format files and an example network service assurance system policy engine framework policy and generates as an output a code for converting any JavaScript object notation format file into a network service assurance system policy engine framework policy, and transforming, using the code, the plurality of JavaScript object notation format files into a plurality of network service assurance system policy engine framework policies.

BRIEF DESCRIPTION OF THE DRAWINGS

The teachings of the present disclosure can be readily understood by considering the following detailed description in conjunction with the accompanying drawings, in which:

FIG. 3, for instance, illustrates an example set of supplementary metadata that may be associated with a set of NMA alarm processing rules;

FIG. 4, for instance, illustrates an example comma-separated values format data file.

To facilitate understanding, identical reference numerals have been used, where possible, to designate identical elements that are common to the figures.

DETAILED DESCRIPTION

Figure 1:
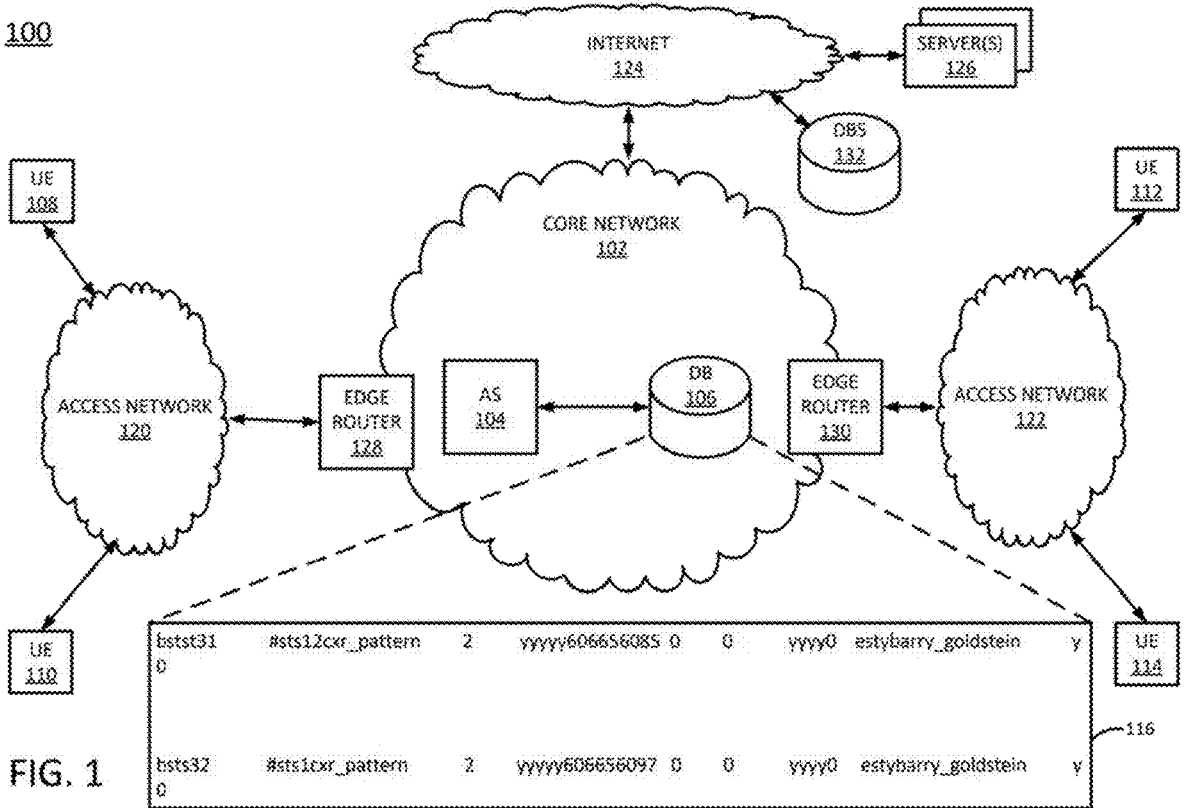
FIG. 1 illustrates an example system in which examples of the present disclosure for converting network monitoring and analysis alarm processing rules into network service assurance system policy engine framework policies may operate.

In one example, the present disclosure provides a system, method, and non-transitory computer readable medium for automatically converting network monitoring and analysis alarm processing rules into network service assurance system policy engine framework policies. As discussed above, in wireless networking, a network monitoring and analysis (NMA) system is responsible for monitoring a wireless network to ensure optimal availability and performance of the network. The NMA system may use alarm processing rules to generate a singular, actionable root cause trouble ticket for alarms that are generated within the network (where the alarms may indicate the presence of conditions, such as hardware failures, key performance indicator degradations, or the like, that may lead to sub-optimal network performance). The alarm processing rules are crucial for supervising the Layer 1 transport network. An NMA system may have over 100,000 alarm processing rules.

The alarm processing rules typically reside in a flat file format, with their definitions solely dictated by filled values. Supplementary metadata may provide the positional range for each field of an alarm processing rule, which facilitates the association of the data in the flat files with the data's corresponding fields. This makes the alarm processing rules less accessible and more difficult to manage than if the alarm processing rules resided in a different file format.

There is interest in transitioning the NMA function (i.e., of generating root cause trouble tickets) toward the broader scope of a network service assurance system (NSAS). In order to accomplish this, NMA alarm processing rules would need to be converted into NSAS policy engine framework (PEF) policies, which is a time- and labor-intensive effort requiring a substantial amount of pre-processing and post-processing. Often, the conversion involves manual management and processing of the NMA rules, which is time consuming and prone to error. Basic programming scripts may be used to speed parts of the process, but these scripts typically lack the sophistication needed to handle a task of this complexity. Other solutions have attempted to simplify or reduce the number of the NMA alarm processing rules themselves, but this may result in a loss of effectiveness. Past efforts to transition to more modern platforms or programming languages have proven to be costly and disruptive, and still fail to fully address the problem of managing such a large number of complex rules.

Examples of the present disclosure strategically consolidate and migrate NMA alarm processing rules into NSAS PEF policies. In one example, a multi-tiered conversion process begins by transforming data in the alarm processing rule files into a more accessible comma-separated values (CSV) format. An unsupervised clustering technique may next be used to refine the data in the CSV format, which may subsequently be consolidated into a fewer number of rules in a JavaScript object notation (JSON) format. One or more of these JSON rules may be provided to a generative artificial intelligence (AI) technique along with an example NSAS PEF policy. The generative AI may use the JSON rule(s) and the example NSAS PEF policy to generate code that is capable of transforming any given JSON file into an NSAS PEF policy. These and other aspects of the present disclosure are discussed in further detail with reference to FIGS. 1-5, below.

To further aid in understanding the present disclosure, FIG. 1 illustrates an example system 100 in which examples of the present disclosure for automatically converting network monitoring and analysis alarm processing rules into network service assurance system policy engine framework policies may operate. In one example, the system may comprise or include all or part of a network monitoring and analysis system. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/ Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a smart phone, a tablet computer, a laptop computer, a gaming device, a wearable smart device (e.g., a smart watch, a head mounted display, or the like), an IoT device, a connected vehicle, a bank or cluster of such devices, and the like. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. In one example, at least some of the servers 126 and DBs 132 may host applications that manage review of code changes by generating notifications for delegating code review tasks.

In accordance with the present disclosure, the AS 104 may be configured to provide one or more operations or functions in connection with examples of the present disclosure for automatically converting network monitoring and analysis alarm processing rules into network service assurance system policy engine framework policies, as described herein. For instance, when an NMA system is migrated to an NSAS, the NMA alarm processing rules must similarly be migrated to NSAS PEF policies.

The NMA alarm processing rules may be stored in a database, such as DB 106. The NMA alarm processing rules may be used by an NMA system to analyze alarms that are generated by the NMA and to take appropriate actions in response to the alarms. The DB 106 may store 100,000 or more NMA alarm processing rules for a single NMA system. In one example, the NMA alarm processing rules may be stored in the DB 106 in a flat text file format, as shown by the example NMA alarm processing rule 116. When the NMA system is migrated to an NSAS, as described above, the NMA alarm processing rules will need to be transformed into NSAS PEF policies in order to be properly processed by the NSAS.

In one example, the AS 104 may perform the conversion from NMA alarm processing rules to NSAS PEF policies. In one example, AS 104 may utilize machine learning techniques, such as one or more unsupervised clustering techniques, to cluster and aggregate the NMA alarm processing rules, so that there are fewer NMA rules that will ultimately need to be transformed into MSAS PEF policies. This will speed the conversion process for the NMA alarm processing rules that are stored in the DB 106.

Once the NMA alarm processing rules have been consolidated, the NMA alarm processing rules may be converted into JavaScript object notation (JSON) format files. Subsequently, the AS 104 may use a generative AI technique to generate a code (broadly a software program having one or more computer instructions) that can be used to convert the JSON files into NSAS PEF policies. For instance, the AS 104 may provide one or more of the JSON files to the generative AI technique, along with an example NSAS PEF policy, and may request that the generative AI technique generate one or more codes that can transform the JSON file(s) into a file that conforms to the conventions of the NSAS PEF policy. Once these codes have been generated, the codes may be used by the AS 104 to convert NMA alarm processing rules in the aggregated clusters into new NSAS PEF policies. The new NSAS PEF policies, as well as the codes, may be stored in the DB 106.

Figure 5:
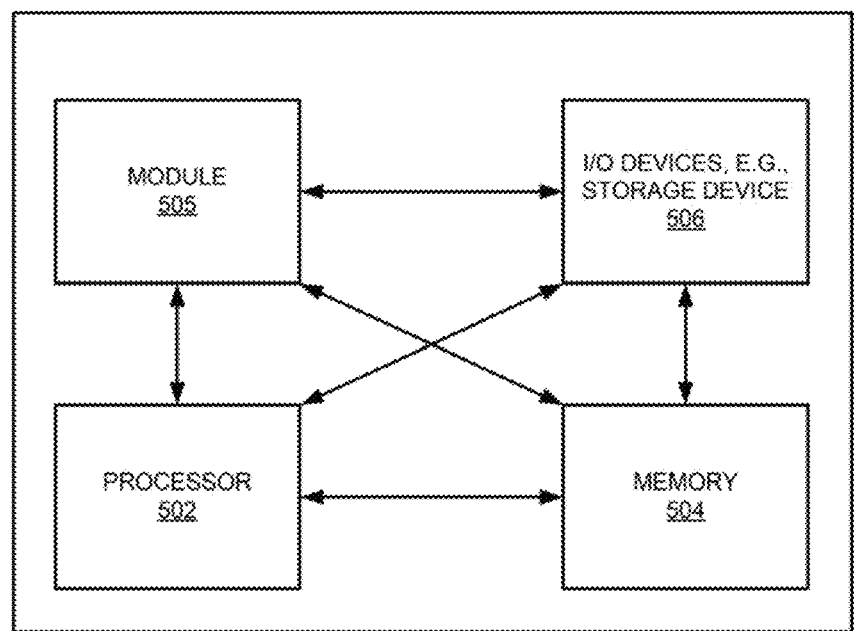
FIG. 5 depicts a high-level block diagram of a computing device specifically programmed to perform the functions described herein.

The AS 104 may comprise one or more physical devices, e.g., one or more computing systems or servers, such as computing system 500 depicted in FIG. 5, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure.

In one example, the AS 104 may load instructions into a memory, or one or more distributed memory units, and execute the instructions for automatically converting network monitoring and analysis alarm processing rules into network service assurance system policy engine framework policies, as described herein. For instance, an example method for automatically converting network monitoring and analysis alarm processing rules into network service assurance system policy engine framework policies is discussed in further detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
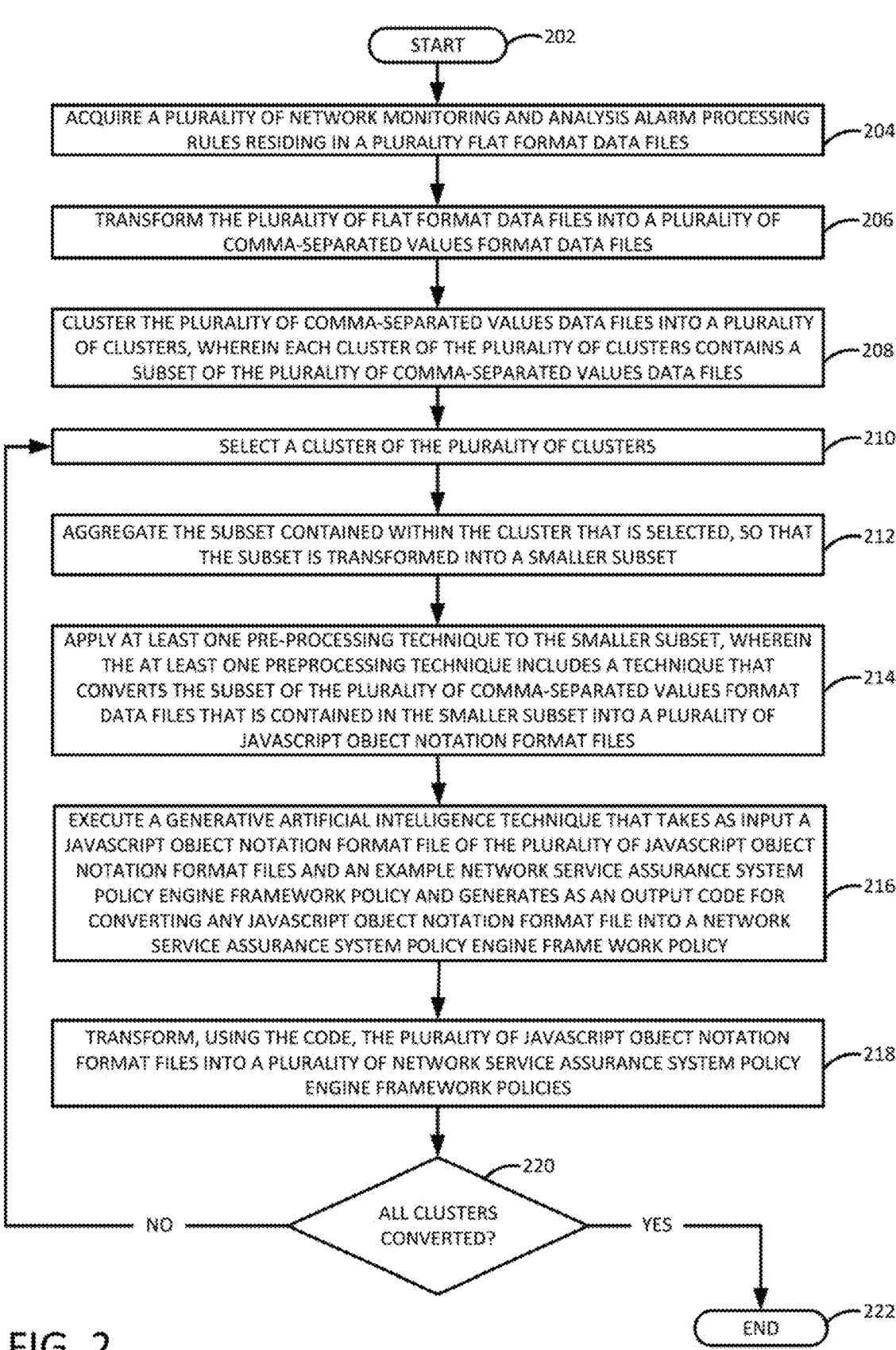
FIG. 2 illustrates a flowchart of an example method for converting network monitoring and analysis alarm processing rules into network service assurance system policy engine framework policies, according to examples of the present disclosure.

To further aid in understanding the present disclosure, FIG. 2 illustrates a flowchart of an example method 200 for automatically converting network monitoring and analysis alarm processing rules into network service assurance system policy engine framework policies. In one example, the method 200 may be performed by the AS 104 or by another element of the core network 102 illustrated in FIG. 1. However, in other examples, the method 200 may be performed by another device, such as the computing system 500 of FIG. 5, discussed in further detail below. For the sake of discussion, the method 200 is described below as being performed by a processing system (where the processing system may comprise a component of the AS 104 or by another element of the core network 102, the computing system 500, or another device).

The method 200 begins in step 202. In step 204, the processing system may acquire a plurality of network monitoring and analysis alarm processing rules residing in a plurality of flat format data files.

Figure 3:
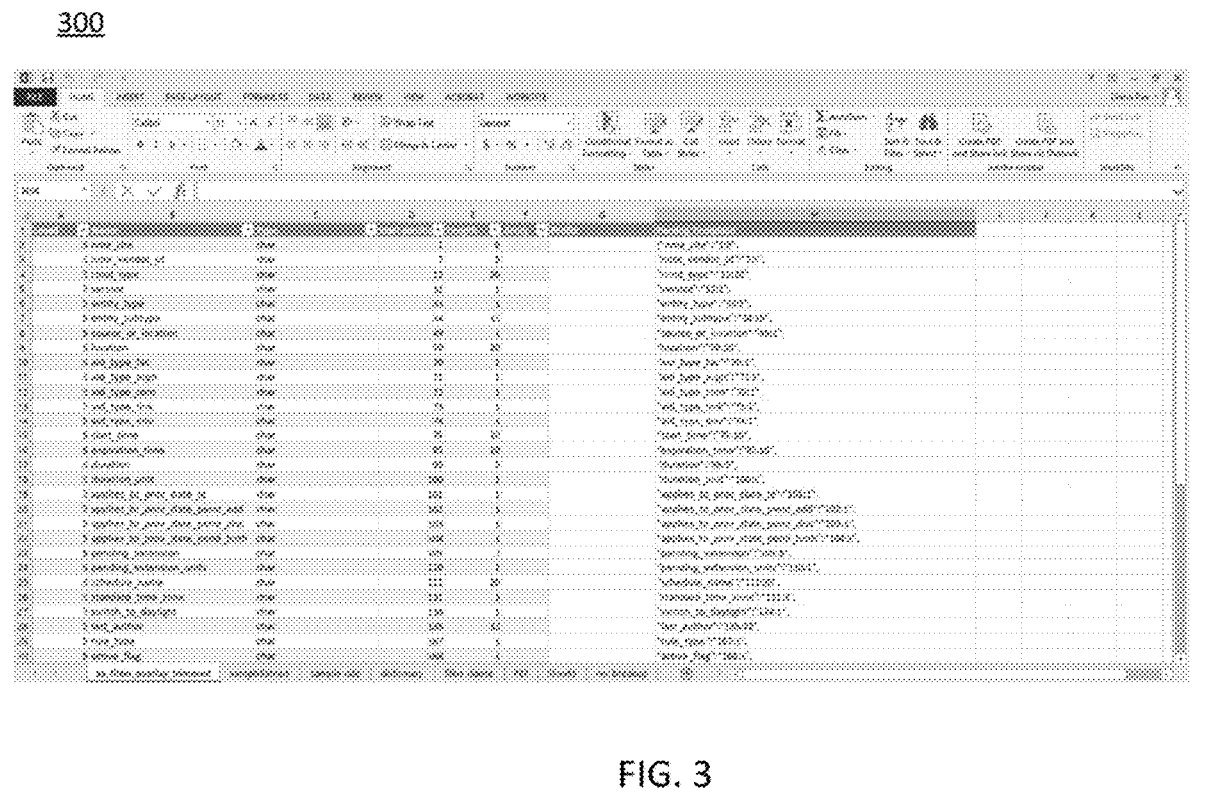

As discussed above, NMA alarm processing rules typically reside in a flat text file format, with their definitions solely dictated by filled values. Supplementary metadata may provide the positional range for each field of an alarm processing rule (e.g., characters 1-6 are associated with field xyz), which facilitates the association of the data in the flat files with the data's corresponding fields. FIG. 3, for instance, illustrates an example set of supplementary metadata 300 that may be associated with a set of NMA alarm processing rules.

Figure 4:
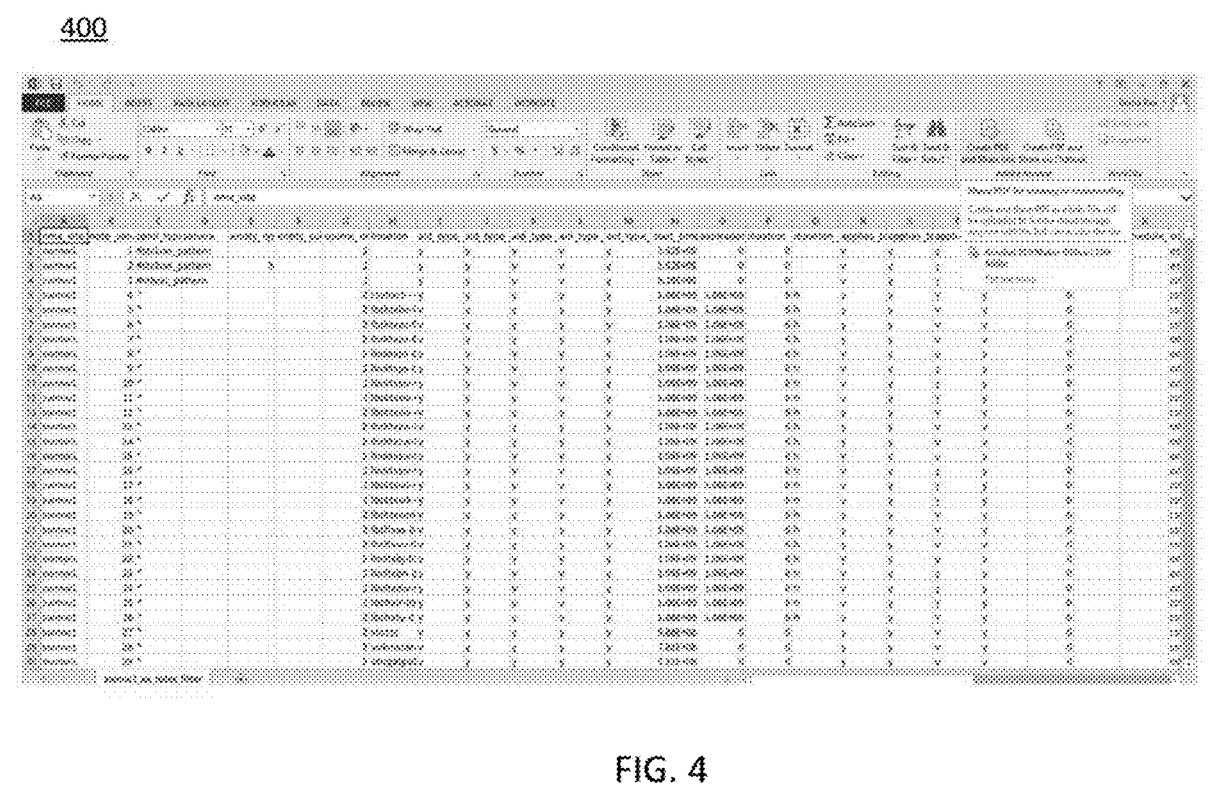

In step 206, the processing system may transform the plurality of flat format data files into a plurality of comma-separated values format data files. Comma-separated values (CSV) is a text file format that uses commas to separate values and newlines to separate records. Numbers and text are stored in plain text, where each line of a CSV file generally represents one data record. FIG. 4, for instance, illustrates an example comma-separated values format data file 400. CSV format is typically considered a more accessible format than the flat file format NMA alarm processing rules reside in, since CSV pairs the fields of the data files with their respective values. Various tools exist for converting flat text files into CSV files.

In step 208, the processing system may cluster the plurality of comma-separated values data files into a plurality of clusters, wherein each cluster of the plurality of clusters contains a subset of the plurality of comma-separated values data files. In one example, clustering is performed using an unsupervised clustering technique, such as k-means clustering, hierarchical clustering, a term frequency inverse document frequency (TF-IDF) vectorizer, or the like. The unsupervised clustering technique will make a best attempt to group similar data files together in a common cluster of the plurality of clusters, where the similarity may be based on a criterion chosen by the unsupervised clustering technique. In other words, the unsupervised clustering technique is not given any criteria around which to cluster the plurality of comma-separated values, but rather creates what the unsupervised clustering technique perceives to be the "best" or most logical plurality of clusters. Thus, different unsupervised clustering techniques may produce different results, i.e., different pluralities of clusters that are generated based on different criteria.

In one example, the plurality of clusters may be manually validated by a domain expert, who may review the plurality of clusters to determine whether the clustering criteria utilized by the unsupervised clustering technique make sense for the particular domain at issue (e.g., whether it makes sense to cluster the subset of the plurality of comma-separated values data files contained in a cluster together). If the domain expert validates the plurality of clusters, then subsequent steps of the method 200 may proceed based on the plurality of clusters that is generated in step 208. If, however, the domain expert does not validate the plurality of clusters, then clustering may be re-attempted, potentially using a different clustering technique. In one example, the clustering of step 208 may be performed using two or more different clustering techniques to generate two or more sets of clusters. The domain expert in this case may review the two or more sets of clusters and select a best set of clusters, or may select none of the sets of clusters at all (in which case clustering may be reattempted using a new clustering technique).

In step 210, the processing system may select a cluster of the plurality of clusters. In one example, the plurality of clusters (or a subset of the plurality of clusters) may be processed in parallel (i.e., simultaneously) according to subsequent steps of the method 200. However, in a first iteration of the method 200, a single cluster may be processed to facilitate the generation of a code for converting the plurality of comma-separated values data files into NSAS PEF policies, as discussed in further detail below. This code may subsequently be used to process other clusters of the plurality of clusters, either in parallel or one cluster at a time. However, each cluster of the plurality of clusters will be processed in the same manner according to steps 212-214 and 218, described in further detail below. Thus, the following steps are performed separately for each cluster of the plurality of clusters.

In step 212, the processing system may aggregate the subset contained within cluster that is selected, so that the subset is transformed into a smaller subset. In one example, aggregating a subset of the plurality of comma-separated values data files contained in a common cluster may involve generalizing some of the comma-separated values data files in the subset so that the total number of comma-separated values files contained in the cluster can be reduced.

In step 214, the processing system may apply at least one pre-processing technique to the smaller subset, wherein the at least one pre-processing technique includes a technique that converts the subset of the plurality of comma-separated values data files that is contained in the smaller subset into a plurality of JavaScript object notation (JSON) format files.

In one example, the at least one pre-processing technique includes filtering out or deleting any comma-separated values data files corresponding to NMA alarm processing rules that are flagged as inactive. In other words, NMA alarm processing rules that are not currently in use may be discarded, as they do not need to be converted to an NSAS PEF policy. In a further example, any comma-separated values data files corresponding to NMA alarm processing rules that lack specific attributes which would make the rules usable in an NSAS system may also be filtered out. As an example, if the attributes are start_time and end_time, and a time associated with an alarm processing rule falls outside the range defined between start_time and end_time, then the alarm processing rule may be unusable. Since such alarm processing rules would be unusable in an NSAS system, resources do not need to be wasted on further processing and conversion of the corresponding comma-separated values data files.

In another example, the at least one pre-processing technique includes performing a table translation from coded NMA values to corresponding NSAS names for one or more predefined data attributes of the comma-separated values data files. For instance, for clustering, it is better to use actual values instead of abbreviations that represent the values (e.g., ticket_status=01(Active), ticket_status=02(Processing), where 01 and 02 would be closer than the values of the ticket_status).

In another example, the at least one pre-processing technique includes converting any time values contained in a comma-separated values data file from the Stratus epoch (i.e., starting Jan. 1, 1980) to the Unix epoch.

In another example, the at least one pre-processing technique includes constructing filter clause logical expressions using NSAS event attributes that correspond to NMA rule fields contained in the comma-separated values data files.

Regardless of the pre-processing technique(s) applied, once pre-processing is completed, the subset of the plurality of comma-separated values format data files contained in the smaller subset is converted into a plurality of JSON format files.

In step 216, the processing system may execute a generative artificial intelligence (AI) technique that takes as input a JavaScript object notation format file of the plurality of JavaScript object notation format files and an example network service assurance system policy engine framework policy and generates as an output a code for converting any JavaScript object notation format file into a network service assurance system policy engine framework policy.

In one example, step 216 may be performed just once, for the first cluster of the plurality of clusters that is selected. The resultant code produced in step 216 may then be used, as described in greater detail in connection with step 218, to convert all clusters (or a subset of) the clusters of the plurality of clusters into NSAS PEF policies. Thus, subsequent iterations of the method 200 may avoid re-executing step 216.

In one example, the generative AI technique may comprise a large language model (LLM), a small language model (SLM), or another type of generative AI.

In step 218, the processing system may transform, using the code, the plurality of JavaScript object notation format files into a plurality of network service assurance system policy engine framework policies.

As discussed above, the output of the generative AI technique executed in step 216 may be a code that can be used to convert any JavaScript object notation format file into a network service assurance system policy engine framework policy. Thus, this code may be used to convert all JSON files in all clusters of the plurality of clusters into NSAS PEF policies.

In step 220, the processing system may determine whether all clusters of the plurality of clusters have had their respective subset of the plurality of comma-separated values data files converted into a plurality of network service assurance system policy engine framework policies.

If the processing system concludes in step 220 that any clusters of the plurality of clusters have not had their respective subset of the plurality of comma-separated values data files converted into a plurality of network service assurance system policy engine framework policies, then the method 200 may return to step 210, and the processing system may proceed as described above to select a next cluster of the plurality of clusters (i.e., a cluster which has not yet had its respective subset of the plurality of comma-separated values data files converted into a plurality of network service assurance system policy engine framework policies). The processing system may then iterate through steps 212-218 for the next cluster.

If, however, the processing system concludes in step 220 that all clusters of the plurality of clusters have had their respective subset of the plurality of comma-separated values data files converted into a plurality of network service assurance system policy engine framework policies, then the method 200 may end in step 222.

Thus, examples of the present disclosure automate the conversion of NMA alarm processing rules to NSAS PEF policies, simplifying the migration from an NMA architecture to an NSAS architecture. Unsupervised clustering of NMA alarm processing rules allows the number of NMA alarm processing rules (which may number 100,000 or more) to be reduced, resulting in fewer rules that need to be converted to NSAS PEF policies (but without loss of information or functionality). Using generative AI to generate the NSAS policies from consolidated NMA rules ensures more efficient and effective migration of rules, with less potential for human error.

Moreover, by automating the conversion process, valuable human resources can be conserved and allocated to areas where the resources may be put to better use. Ultimately, examples of the present disclosure may allow for better network management and more reliable services in a wireless communications network, which will improve customer experience and satisfaction.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 5 depicts a high-level block diagram of a computing device specifically programmed to perform the functions described herein. For example, any one or more components or devices illustrated in FIG. 1 or described in connection with the method 200 may be implemented as the system 500. For instance, any one or more of the servers 104 or 126 or edge routers 128 or 130 of FIG. 1 (such as might be used to perform the method 200) could be implemented as illustrated in FIG. 5. As depicted in FIG. 5, the system 500 comprises a hardware processor element 502, a memory 504, a module 505 for automatically converting network monitoring and analysis alarm processing rules into network service assurance system policy engine framework policies, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for automatically converting network monitoring and analysis alarm processing rules into network service assurance system policy engine framework policies may include circuitry and/or logic for converting NMA alarm processing rules into NSAS PEF policies. The input/output devices 506 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for automatically converting network monitoring and analysis alarm processing rules into network service assurance system policy engine framework policies can be loaded into memory 504 and executed by hardware processor element 502 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for automatically converting network monitoring and analysis alarm processing rules into network service assurance system policy engine framework policies (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

acquiring, by a processing system including at least one processor, a plurality of network monitoring and analysis alarm processing rules residing in a plurality of flat format data files;

transforming, by the processing system, the plurality of flat format data files into a plurality of comma-separated values format data files;

clustering, by the processing system, the plurality of comma-separated values data files into a plurality of clusters, wherein each cluster of the plurality of clusters contains a subset of the plurality of comma-separated values data files;

for a selected cluster of the plurality of clusters, aggregating, by the processing system, the subset contained within the selected cluster, so that the subset is transformed into a smaller subset;

applying, by the processing system, at least one pre-processing technique to the smaller subset, wherein the at least one pre-processing technique includes a technique that converts the smaller subset of the plurality of comma-separated values data files into a plurality of javascript object notation format files;

executing, by the processing system, a generative artificial intelligence technique that takes as an input a javascript object notation format file of the plurality of javascript object notation format files and an example network service assurance system policy engine framework policy and generates as an output a code for converting any javascript object notation format file into a network service assurance system policy engine framework policy; and transforming, by the processing system using the code, the plurality of javascript object notation format files into a plurality of network service assurance system policy engine framework policies, wherein the plurality of network service assurance system policy engine framework policies encode the plurality of network monitoring and analysis alarm processing rules in a file format that is accessible by a network service assurance system.

2. The method of claim 1, wherein a metadata file provides positional ranges for fields of each network monitoring and analysis alarm processing rule of the plurality of network monitoring and analysis alarm processing rules.

3. The method of claim 1, wherein the clustering is performed using an unsupervised clustering technique.

4. The method of claim 3, wherein the unsupervised clustering technique comprises a k-means clustering technique.

5. The method of claim 3, wherein the unsupervised clustering technique comprises a hierarchical clustering technique.

6. The method of claim 3, wherein the unsupervised clustering technique comprises a term frequency inverse document frequency vectorizer.

7. The method of claim 1, wherein the clustering comprises using at least two different clustering techniques to generate at least two different sets of clusters, and the plurality of clusters comprises a set of the at least two different sets of clusters that is selected by a domain expert.

8. The method of claim 1, wherein the aggregating comprises generalizing those of the plurality of comma-separated values data files contained in the selected cluster.

9. The method of claim 1, wherein the at least one pre-processing technique further includes filtering out those of the plurality of comma-separated values data files that are contained in the selected cluster and that correspond to a network monitoring and analysis alarm processing rule of the plurality of network monitoring and analysis alarm processing rules that is flagged as inactive.

10. The method of claim 1, wherein the at least one pre-processing technique further includes filtering out those of the plurality of comma-separated values data files that are contained in the selected cluster and that lack an attribute necessary to be usable by a network service assurance system.

11. The method of claim 1, wherein the at least one pre-processing technique further includes performing, for a data attribute of at least one comma-separated values data file of the plurality of comma-separated values data files contained in the selected cluster, a table translation from a code network monitoring and analysis value to a corresponding network service assurance system name.

12. The method of claim 1, wherein the at least one pre-processing technique further includes constructing, for an event attribute of at least one comma-separated values data file of the plurality of comma-separated values data files contained in the selected cluster, a filter clause logical expression using a network service assurance system event attribute that corresponds to a network monitoring and analysis rule field contained in the at least one comma-separated values data file.

13. The method of claim 1, wherein the at least one pre-processing technique further includes converting, for a time value contained in at least one comma-separated values data file of the plurality of comma-separated values data files contained in the selected cluster, the time value from a stratus epoch to a unix epoch.

14. The method of claim 1, wherein the generative artificial intelligence technique is at least one of: a large language model or a small language model.

15. The method of claim 1, further comprising:
repeating the aggregating, the applying, and the transforming for a remainder of the clusters of the plurality of clusters, wherein the repeating the transforming is performed using the code.

16. A non-transitory computer-readable medium storing instructions which, when executed by a processing system including at least one processor, cause the processing system to perform operations, the operations comprising:
acquiring a plurality of network monitoring and analysis alarm processing rules residing in a plurality of flat format data files;
transforming the plurality of flat format data files into a plurality of comma-separated values format data files;
clustering the plurality of comma-separated values data files into a plurality of clusters, wherein each cluster of the plurality of clusters contains a subset of the plurality of comma-separated values data files;
for a selected cluster of the plurality of clusters, aggregating the subset contained within the selected cluster, so that the subset is transformed into a smaller subset;
applying at least one pre-processing technique to the smaller subset, wherein the at least one pre-processing technique includes a technique that converts the smaller subset of comma-separated values data files into a plurality of javascript object notation format files;
executing a generative artificial intelligence technique that takes as an input a javascript object notation format file of the plurality of javascript object notation format files and an example network service assurance system policy engine framework policy and generates as an output a code for converting any javascript object notation format file into a network service assurance system policy engine framework policy; and
transforming, using the code, the plurality of javascript object notation format files into a plurality of network service assurance system policy engine framework policies, wherein the plurality of network service assurance system policy engine framework policies encode the plurality of network monitoring and analysis alarm processing rules in a file format that is accessible by a network service assurance system.

17. The non-transitory computer-readable medium of claim 16, wherein the clustering is performed using an unsupervised clustering technique.

18. The non-transitory computer-readable medium of claim 16, wherein the generative artificial intelligence technique is at least one of: a large language model or a small language model.

19. The non-transitory computer-readable medium of claim 16, further comprising:
repeating the aggregating, the applying, and the transforming for a remainder of the clusters of the plurality of clusters, wherein the repeating the transforming is performed using the code.

20. A system comprising:
a processing system including at least one processor; and
a non-transitory computer-readable medium storing instructions which, when executed by the processing system, cause the processing system to perform operations, the operations comprising:
acquiring a plurality of network monitoring and analysis alarm processing rules residing in a plurality of flat format data files;
transforming the plurality of flat format data files into a plurality of comma-separated values format data files;

clustering the plurality of comma-separated values data files into a plurality of clusters, wherein each cluster of the plurality of clusters contains a subset of the plurality of comma-separated values data files;

for a selected cluster of the plurality of clusters, aggregating the subset contained within the selected cluster, so that the subset is transformed into a smaller subset;

applying at least one pre-processing technique to the smaller subset, wherein the at least one pre-processing technique includes a technique that converts the smaller subset of comma-separated values data files into a plurality of javascript object notation format files;

executing a generative artificial intelligence technique that takes as an input a javascript object notation format file of the plurality of javascript object notation format files and an example network service assurance system policy engine framework policy and generates as an output a code for converting any javascript object notation format file into a network service assurance system policy engine framework policy; and transforming, using the code, the plurality of javascript object notation format files into a plurality of network service assurance system policy engine framework policies, wherein the plurality of network service assurance system policy engine framework policies encode the plurality of network monitoring and analysis alarm processing rules in a file format that is accessible by a network service assurance system.

* * * * *